(No Model.)
T. B. NILES.
MACHINE FOR DITCHING AND GRADING.
No. 265,856. Patented Oct. 10, 1882.
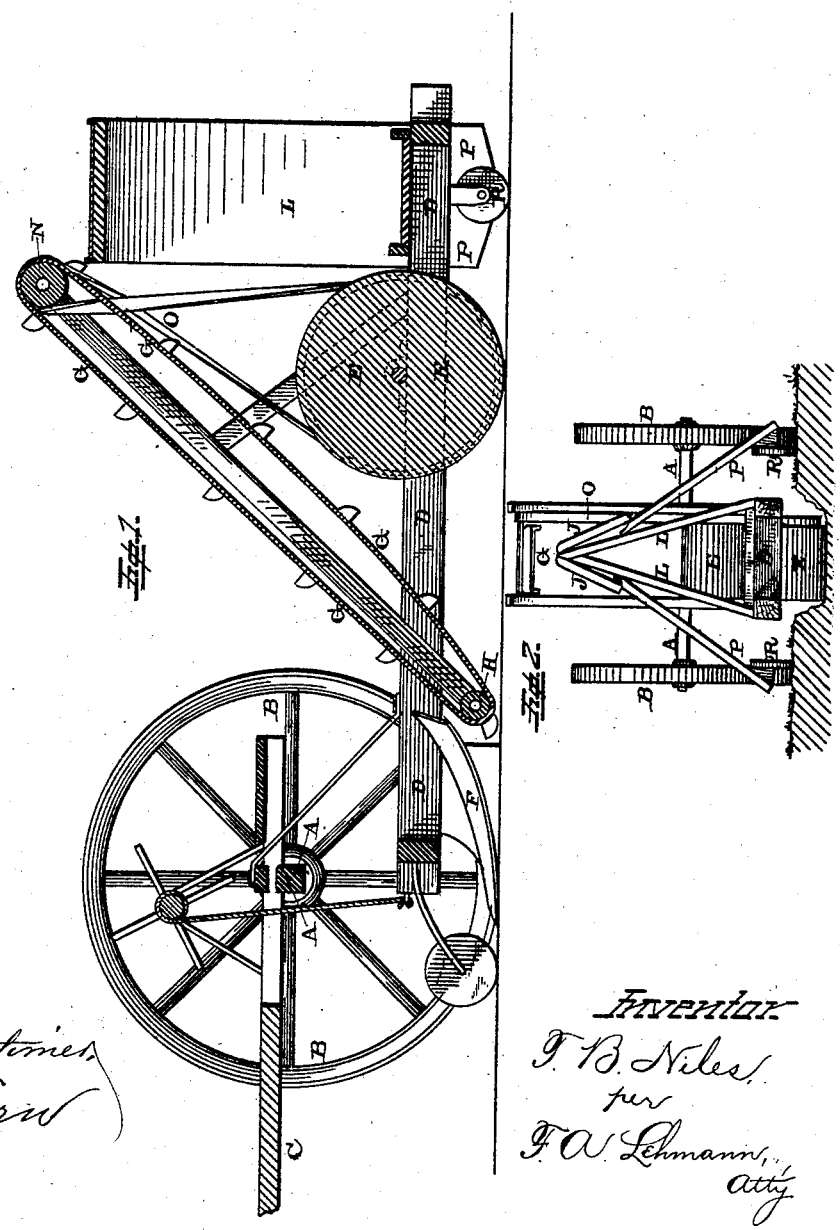
Witnesses.
N. W. Mortimer
W. H. Kern
Inventor
T. B. Niles,
per
F. A. Lehmann,
Atty

UNITED STATES PATENT OFFICE.

TRUMAN B. NILES, OF SWANVILLE, INDIANA.

MACHINE FOR DITCHING AND GRADING.

SPECIFICATION forming part of Letters Patent No. 265,856, dated October 10, 1882.

Application filed February 25, 1882. (No model.)

*To all whom it may concern:*

Be it known that I, T. B. NILES, of Swanville, in the county of Jefferson and State of Indiana, have invented certain new and useful Improvements in Machines for Ditching and Grading; and I do hereby declare the following to be a full, clear, and exact description of the invention, such as will enable others skilled in the art to which it pertains to make and use it, reference being had to the accompanying drawings, which form part of this specification.

My invention relates to an improvement in ditching-machines; and it consists in the combination of two plows, which loosen the dirt and then deposit it on an endless apron which is operated by the supporting-roller at the rear end of the machine, which endless belt carries the dirt up and discharges it upon plates at the rear of the machine, which plates separate the dirt and carry it on both sides, both lower plates being provided with wheels at their lower ends, so as to support them upon the banks of the ditch that is being dug, as will be more fully described hereinafter.

Figure 1 is a vertical section of my invention. Fig. 2 is a rear view of the same.

A represents the axle, B the wheels, and C the tongue, which constitute that part of the machine to which the horses are secured for the purpose of drawing the ditcher forward. To this part of the machine is coupled the frame D, which is supported by the axle at its front end and by the large revolving roller E at its rear end. Secured to the front end of this frame are the two plows or cutters F, which cut and loosen the earth as the machine is being drawn forward, and which are so formed as to deliver the dirt upon the endless apron G, which passes over the roller H in the lower part of the apron-frame, and which apron is provided with suitable buckets or other devices for carrying the dirt up and discharging it upon the plates J, secured to the frame L, that is placed upon the rear end of the frame D. The upper end of the apron also passes over the roller N, which is operated by a cross-belt, O, which passes around the large supporting-roller, and which belt keeps the apron constantly in motion while the machine is moved forward. One end of the supporting-roller is slightly cut away, so as to prevent the belt, while passing around it, from coming in contact with the earth. As the dirt falls from the upper part of the apron it strikes upon the two plates J J, and is divided so as to run equally toward each side of the ditch that is being made. Secured to the same frame as these plates, but lower down, are the two leaves P, which can be opened out as the machine descends into the ditch, and which are provided with the rollers or wheels R at their outer ends, so that they will pass easily over the top of the ground and over any obstructions which may be in the way. Two plates, J P, which overlap at their inner ends, are used, not only as being cheaper, but because the short plate P is not so apt to be injured or broken in case the roller R should catch against some obstruction. This construction also allows the lower plate, P, to stand outward at a greater angle to the frame without having its lower end extend such a great distance from the frame as would be necessary were but a single plate used on each side. These plates J P extend outward from the center on each side of the frame L.

Upon the front part of the machine is placed the usual windlass, by means of which the plows can be raised from and lowered to the ground.

Ditching-machines have heretofore been made in which the ground is loosened by plows and carried up upon an endless apron, which is operated by a roller which runs in the ditch, and then discharged upon a chute which is supported by wheels.

Having thus described my invention, I claim—

1. In a ditching-machine, the combination of the frame D, supported at its front end upon the wheels B and at its rear end by the roller E, which runs in the ditch made by the plows F, the endless apron G, operated by the belt O from the roller, and the plates J J and P P, the latter provided with the rollers R, substantially as shown.

2. In a ditching-machine, the leaves for carrying the dirt to each side of the ditch and provided with a roller or other suitable devices at their outer ends, substantially as specified.

In testimony that I claim the foregoing I have hereunto set my hand this 17th day of September, 1881.

TRUMAN B. NILES.

Witnesses:
 EBENEZER WILSON,
 JOHN E. WILSON.